(12) United States Patent
Klotz et al.

(10) Patent No.: US 7,254,504 B2
(45) Date of Patent: Aug. 7, 2007

(54) METHOD FOR THE TEMPORAL SYNCHRONISATION OF A PLURALITY OF VEHICLE SENSORS

(75) Inventors: Albrecht Klotz, Tuebingen (DE); Werner Uhler, Bruchsal (DE); Martin Staempfle, Ulm (DE)

(73) Assignee: Robert Bosch GmbH, Stuttgart (DE)

( * ) Notice: Subject to any disclaimer, the term of this patent is extended or adjusted under 35 U.S.C. 154(b) by 107 days.

(21) Appl. No.: 10/483,135

(22) PCT Filed: May 4, 2002

(86) PCT No.: PCT/DE02/01620

§ 371 (c)(1),
(2), (4) Date: Jan. 8, 2004

(87) PCT Pub. No.: WO03/008996

PCT Pub. Date: Jan. 30, 2003

(65) Prior Publication Data

US 2004/0177285 A1 Sep. 9, 2004

(30) Foreign Application Priority Data

Jul. 17, 2001 (DE) ................................ 101 33 962

(51) Int. Cl.
*G06F 19/00* (2006.01)
(52) U.S. Cl. .......................................... 702/89; 702/85
(58) Field of Classification Search .................. 702/85, 702/89
See application file for complete search history.

(56) References Cited

U.S. PATENT DOCUMENTS

| 2,199,574 | A | * | 5/1940 | Paul ............................ 340/909 |
|-----------|---|---|---------|--------------------------------|
| 3,254,324 | A | * | 5/1966 | Leonard et al. ............. 340/909 |
| 3,328,791 | A | * | 6/1967 | Leonard et al. ............. 340/915 |
| 3,482,208 | A | * | 12/1969 | Auer, Jr. et al. ............ 340/912 |
| 3,828,307 | A | * | 8/1974 | Hungerford .................. 340/909 |
| 4,638,289 | A | * | 1/1987 | Zottnik ........................ 246/45 |
| 6,111,888 | A |   | 8/2000 | Green et al. |
| 6,760,677 | B2 | * | 7/2004 | Tanizume ..................... 702/89 |
| 6,882,912 | B2 | * | 4/2005 | DiLodovico et al. ......... 701/35 |

FOREIGN PATENT DOCUMENTS

| DE | 41 40 017 A | 6/1993 |
|----|-------------|--------|
| DE | 42 10 189 A | 10/1993 |
| DE | 199 57 551 A | 6/2001 |
| EP | 0 924 899 A | 6/1999 |
| EP | 1 193 913 A | 4/2002 |

* cited by examiner

*Primary Examiner*—John Barlow
*Assistant Examiner*—Douglas N Washburn
(74) *Attorney, Agent, or Firm*—Michael J. Striker

(57) ABSTRACT

The invention proposes a synchronization method and apparatus, wherein based on a measuring time (110, 210) and the value of at least one quantity of the at least one sensor object, the at least one sensor object is determined at at least one of the base times ($t_{k-1}$, $t_k$, $t_{k+1}$).

6 Claims, 1 Drawing Sheet

METHOD FOR THE TEMPORAL SYNCHRONISATION OF A PLURALITY OF VEHICLE SENSORS

CROSS-REFERENCE

The invention described and claimed hereinbelow is also described in PCT/DE 02/01620, filed on May 4, 2002 and DE 101 33 962.3, filed Jul. 17, 2001. This German Patent Application, whose subject matter is incorporated here by reference, provides the basis for a claim of priority of invention under 35 U.S.C. 119(a)-(d).

BACKGROUND OF THE INVENTION

Modern vehicle guidance functions, e.g. ACC (adaptive cruise control), are based on the generation and processing of data of only one environmental sensor, for example a 77 GHz FMCW radar. As a rule, regulating and function algorithms operate in the same timing pulse as the sensor itself and are therefore essentially automatically synchronous and do not have to be synchronized with the sensor data.

SUMMARY OF THE INVENTION

It is therefore an object of the present invention to provide synchronization method and apparatus which are further improvements of the existing methods and apparatuses.

In keeping with these objects and with others which will become apparent herein after, one feature of the present invention resides, briefly stated in a method for synchronizing sensor data of a sensor object which includes the steps of detecting the object by at least one vehicle sensor at a sensor-specific measuring time; synchronizing sensor data of the sensor object detected by the at least one vehicle sensor at the sensor-specific measuring time to a common time base comprised of a number of base times; representing by the sensor data at least one quantity that is characteristic for a sensor object; and, based on the measuring time and on a value of the quantity of the measuring time, determining a value of this quantity at at least one of the base times.

It is also another object of the present invention to provide an apparatus for synchronized sensors of the inventive data which includes vehicle sensors that generate sensor data; and a data platform that receives the sensor data.

The method according to the invention and the apparatus according to the invention for synchronizing sensor data have the advantage over the prior art that the data of independently operating environmental sensors can be synchronized to a common time base. This makes it possible to achieve the highest possible degree of temporal integrity of the data for the data evaluation that occurs after the measurement, in particular in a data evaluation unit.

Advantageous modifications and improvements of the method and apparatus disclosed in the attached claims are possible through the steps taken in the dependent claims.

An exemplary embodiment of the invention is shown in the drawings and will be explained in detail in the subsequent description.

DESCRIPTION OF THE PREFERRED EMBODIMENT

Figure 1:
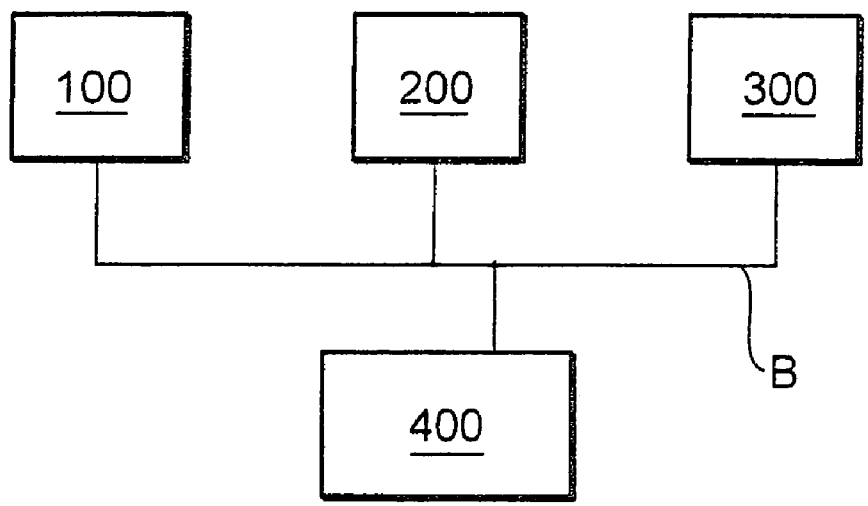
FIG. 1 shows a system for detecting and evaluating sensor data.

FIG. 1 shows a system for generating and processing sensor data. As a rule, a system of this kind according to the invention includes a number of sensors; this indeterminate number of sensors is represented in FIG. 1 by a first sensor 100, a second sensor 200, and a third sensor 300. Naturally, it is also possible for the method according to the invention to be executed with only a single sensor, for example the first sensor 100, but as a rule, at least two sensors are provided.

In addition to the sensors 100, 200, 300, the system shown in FIG. 1 also includes a bus system B and an evaluation unit 400, which is also referred to as the data platform 400. The bus system B connects the respective sensors 100, 200, 300 to the data platform 400. According to the invention, a bus system designed in accordance with the CAN architecture (controller area network) is suitable for use as the bus system. According to the invention, however, it is also possible to provide a different bus system for producing a connection between the respective sensors 100, 200, 300 and the data platform 400.

As a rule, the data platform 400 contains a microprocessor, which includes a software or hardware-based sensor data fusion unit. In the text that follows, the sensor data fusion unit, which is also referred to below for short as "SDF" for "sensor data fusion", is described in the form of a software-based implementation.

The essence of the invention is a method in which the data from the sensors 100, 200, 300, which are also referred to below as environmental sensors 100, 200, 300, are converted to a single time base. The data of the environmental sensors 100, 200, 300, which are also referred to as sensor data below, include in particular position and speed data of objects. One particular application of the invention involves positioning the sensors 100, 200, 300 in or on a motor vehicle and using them to sense the environment of the motor vehicle. This is why the sensors 100, 200, 300 are also referred to as environmental sensors. In this context, an object can in particular be a material object in the environment of a motor vehicle equipped with the sensors 100, 200, 300.

In general, the environmental sensors 100, 200, 300 operate independently of one another, asynchronously and, in certain circumstances, with variable cycle times. The clock cycle of the sensor data fusion unit or the data platform 400 is used as a basis for the synchronization to a common time base. This common time base is comprised of a sequence of base times, which are referred to below as $t_{k-1}$, $t_k$, $t_{k+1}$. The clock cycle of this common time base can be either variable or constant. Preferably, the clock cycle of the time base is at least as great as the fastest individual sensor clock cycle, i.e. the cycle time of the individual sensor that is timed with the highest clock rate.

It is desirable for the objects in the environment of a motor vehicle to be represented as completely as possible, for example in the form of data objects, in the sensor data fusion unit or the sensor data fusion software, the SDF for short. To this end, it is necessary to know the location of a given object at a given time. In order to simplify the data-based representation of objects in the vehicle environment as data objects of the sensor data fusion, it is advantageous to refer only to the base times of the common time base of the sensor data fusion. Since the sensors 100, 200, 300 operate independently of the common time base, i.e. asynchronously, the measuring time at which the vehicle environment is sensed by one of the sensors 100, 200, 300 generally does not correspond to the base times.

According to the invention, the value of at least one variable that is characteristic for one of the objects in the vehicle environment can be converted from the measuring time to at least one of the base times. This produces a common time base, comprised of the base times, for the representation of the objects in the vehicle environment as data objects in the sensor data fusion.

In order to execute the synchronization according to the invention, it is first necessary to determine the measuring time of a sensor 100, 200, 300. This occurs in the sensor data fusion unit. Let us assume, for example, that the first sensor 100 has generated a data object based on a measuring procedure and has transmitted it to the data platform 400 via the bus B. In this case, the sensor data fusion unit on the data platform 400 detects the input of the data object by the first sensor 100. As part of this, it provides the data object transmitted via the bus B with a so-called input time stamp. This data object transmitted by the first sensor 100 was in transit between the first sensor 100 and the data platform 400 for an average transmission time. Therefore, in order to more precisely determine the measuring time, from the input time stamp, at least the average transmission time between the first sensor 100 and the data platform 400 is chronologically subtracted from the input time stamp in the data platform 400. In addition, in order to determine the measuring time even more precisely, it is possible—along with the data object transmitted by the first sensor 100—to transmit a so-called sensor dead time, which corresponds to the physical time required by the sensor to produce the data object transmitted to the data platform 400. The sensor dead time corresponds to the period of time between the actual measuring procedure and the supplying of the data object to the bus B for transmission to the data platform 400. For a more precise transmission of the measuring time, therefore, the sensor dead time and the average transmission time must be subtracted from the input time stamp in the data platform 400.

Figure 2:
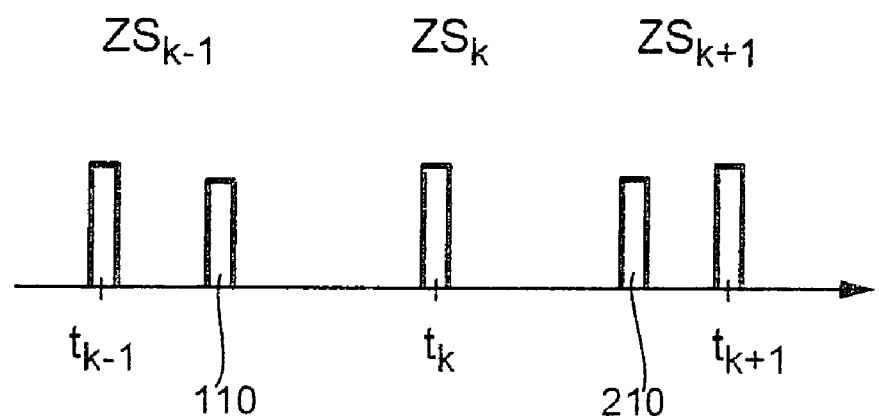
FIG. 2 shows an example for a retrodictive synchronization.

FIG. 2 shows an example for the synchronization of sensor data to a common time base in a manner according to the invention. FIG. 2 shows a time line labeled with the reference letter t. A first base time $t_{k-1}$, a second base time $t_k$, and a third base time $t_{k+1}$ are plotted on the time line. In the example, the base times $t_{k-1}$, $t_k$, $t_{k+1}$ are depicted as temporally equidistant. According to the invention, however, it is also possible for the time base to have a variable clock cycle. FIG. 2 also shows the time stamps belonging to the base times; the first time stamp $ZS_{k-1}$ corresponds to the first base time $t_{k-1}$, the second time stamp $ZS_k$ corresponds to the second base time $t_k$, and the third time stamp $ZS_{k+1}$ corresponds to the third base time $t_{k+1}$. In addition, FIG. 2 shows a first measuring time 110 plotted on the time line between the first base time $t_{k-1}$ and the second base time $t_k$. The first measuring time 110 corresponds to the input time stamp of the data object in the data platform 400, which input time stamp is corrected by the transmission time and possibly also by the sensor dead time. The first measuring time corresponds, for example, to a measurement in the first sensor 100.

Therefore, one or more quantities with regard to the object, which is located in the vehicle's environment and is to be represented, are known at the first measuring time 110 and, according to the invention, are converted to one of the base times $t_{k-1}$, $t_k$, $t_{k+1}$. According to the invention, in particular the position and speed of the object relative to the vehicle, i.e. the x-coordinate and the y-coordinate of the position and the speed are of interest as quantities to be converted. Therefore, the invention provides that at least the position and speed of an object be determined at one of the base times $t_{k-1}$, $t_k$, $t_{k+1}$, which object has a measured and/or calculated position and speed at the first measuring time 110. In particular, the invention provides that at the first measuring time 110, the quantities of interest be converted to the first base time $t_{k-1}$ or to the second base time $t_k$ and that at a second measuring time 210, the quantities of interest be converted to the second base time $t_k$ or to the third base time $t_{k+1}$.

In a so-called retrodictive synchronization, a retrodiction to the first base time $t_{k-1}$ takes place based on the first measuring time 110, i.e. the quantities of interest at the first measuring time 110 are converted to the first base time $t_{k-1}$. Accordingly, in the retrodictive synchronization, the quantities of interest of the second measuring time 210 are converted to the second base time $t_k$. This synchronization is suitable primarily for sensors in which only the distance, i.e. position, of the object to be measured in the vehicle's environment is a directly measured quantity, such as in video sensors, 24 GHz pulse sensor technology, or in a lidar sensor. In these sensor systems, the speeds and accelerations transmitted to the data platform 400 as sensor data by the sensors 100, 200, 300 are determined based on the temporal distance change in relation to previous measurements. The data set of the sensor data is therefore not completely consistent since the data relate to different times or time periods. The retrodictive synchronization increases the temporal cohesion and integrity of these sensor data because based on the measuring times 110, 210, a conversion to an earlier base time is executed, which is chronologically closer to the times over which the speed and the acceleration were calculated. According to the invention, based on a consistent data set stored in the data platform 400 or the sensor data fusion unit, at the first base time $t_{k-1}$ (for the first measuring time 110) and at the second base time $t_k$ (for the second measuring time 210), a prediction of the data at the chronologically subsequent base time is made in order to carry out further evaluation of the sensor data in the sensor data fusion unit.

In the predictive synchronization, the first measuring time 110 is used as a basis for predicting what the quantities of interest of the object will be at the second base time $t_k$ and the second measuring time 210 is used as a basis for predicting what they will be at the third base time $t_{k+1}$. This synchronization is suitable primarily for sensors in which the distance, or position, of the object in the vehicle environment, and the speed of the object are directly measured quantities, for example in FMCW radar. In this instance, only the relative acceleration is a derived measurement value. The data set that the sensors 100, 200, 300 supply to the data platform 400 via the bus system B is therefore temporally consistent in terms of the position and speed of the object in the vehicle environment.

In order to calculate the position of an object at an arbitrary time based on the positions of the object at other times, in particular the equations $$x(t+\Delta t)=x(t)+v*\Delta t+0.5*a*\Delta t^2 \text{ and}$$

$$v(t+\Delta t)=v(t)+a*\Delta t$$

are used, where the letters v and a correspond to the speed and acceleration, respectively. As an alternative to this, developed estimating models that include the tracking data and the current measurement data, for example:

$$x(t+\Delta t)=P(\Delta t)*x(t)$$

are also possible. For the retrodictive synchronization, naturally the time interval Δt must be provided with a negative value because the time to be calculated (base time) in this instance comes before the measuring time.

In order for quantities of the object at one of the measuring times 110, 210 to be synchronized to one of the base times $t_{k-1}$, $t_k$, $t_{k+1}$, the invention particularly provides that model-assisted predictors, e.g. Kalman filters, be used.

In order to determine the measuring times 110, 210, the invention also provides that the data platform 400 send time stamp data to the sensors 100, 200, 300 and that the sensor data sent from the sensors 100, 200, 300 to the data platform 400 relate to the time stamp data and that in order to indicate the measuring time, only the time difference (offset) from a particular time stamp point of the time stamp data be transmitted. This simplifies the association of sensor data to the particular measurement cycles, particularly when the cycle times of the sensors 100, 200, 300 and the data platform 400 differ sharply from one another and when sensors 100, 200, 300 are directly and intentionally operated by the data platform 400 and react to it, for example in attention control and preconditioning.

It is assumed that the sensors execute a sensor-internal tracking, i.e. a "refinding and following" and for each object, in addition to the (kinematic) object data, also supply the attributes "measured" and "historic" as well as an object identification. The object identification is unique and is retained when objects are found again. The "measured" marker indicates that the object has been measured in the current cycle and the "historic" marker indicates that the object has been measured in a preceding cycle. It is also advantageous that a quality level is available for each kinematic measurement value.

According to the invention, the sensors 100, 200, 300 transmit in particular so-called sensor objects in the form of data objects to the data platform 400. In the data platform 400, so-called fusion objects are formed based on the sensor objects. The fusion objects do correspond to data objects as well, but they correspond to ones in which a number of sensor objects can be combined. In order to synchronize the sensor data, a determination is first made as to whether a sensor object transmitted from a sensor 100, 200, 300 has already been associated with a fusion object in the data platform 400 in a preceding cycle. As a result, no complex matching, i.e. association, is required between fusion objects from the preceding cycles and current sensor objects. The association is merely checked by means of the object identification of the sensor object in the list of sensor objects contained in a fusion object and by means of the presence of the "historic" marker of the relevant sensor object. If no association is found based on the identification, then the synchronization is executed without reference to the fusion objects and the position of the object is calculated based on the object data already present for previous times, in particular by means of the formulas given on page 7, paragraph 2. If an association is found, then based on the quality value and the "measured" markers, a differentiation is made between sensor data and the fusion data comprised of the fusion objects as to which of the quantities for the synchronization are used with which weighting. The higher the quality, the higher the weighting in the calculation of the synchronization. One advantage of the method according to the invention lies in the fact that the fusion data, which have a higher quality averaged over time than the individual sensor data, can be used for the synchronization without a large amount of additional algorithmic calculation and have a higher weighting than the sensor data.

The invention claimed is:

1. A method for synchronizing sensor data of a sensor object, comprising the steps of detecting the object by at least one vehicle sensor at a sensor-specific measuring time; synchronizing sensor data of the sensor object detected by the at least one vehicle sensor at the sensor-specific measuring time to a common time base comprised of a number of base times; representing by the sensor data at least one quantity that is characteristic for a sensor object; and, based on the measuring time and on a value of the quantity of the measuring time, converting the value of this quantity to change the value of quantity from the measuring time to at least one of the base times, and using the latter for synchronizing the sensor data of the sensor object.

2. A method as defined in claim 1; and further comprising providing the measuring time chronologically before the base time.

3. A method as defined in claim 1; and further comprising providing a measuring time chronologically after the base time.

4. A method as defined in claim 1; and further comprising providing at least one quantity as a measured quantity.

5. A method as defined in claim 1; and further comprising providing at least one quantity as a calculated quantity.

6. An apparatus for synchronizing sensor data, comprising: at least one vehicle sensor that generates the sensor data; and a data platform that receives the sensor data, wherein said sensor data is synchronized for executing a method comprising the steps of detecting an object by the at least one vehicle sensor at a sensor-specific measuring time; synchronizing sensor data of the sensor object detected by the at least one vehicle sensor at the sensor-specific measuring time to a common time base comprised of a number of base times; representing by the sensor data at least one quantity that is characteristic for the sensor object; and, based on the measuring time and on a value of the quantity of the measuring time, converting the value of this quantity to change the value of this quantity from the measuring time to at least one of the base times, and using the latter for synchronizing the sensor data of the sensor object.

* * * * *